United States Patent [19]

Huggins

[11] 4,139,812
[45] Feb. 13, 1979

[54] BATTERY CHARGING APPARATUS

[75] Inventor: Ernest E. J. Huggins, Sussex, England

[73] Assignee: The Post Office, London, England

[21] Appl. No.: 817,056

[22] Filed: Jul. 19, 1977

[30] Foreign Application Priority Data

Jul. 23, 1976 [GB] United Kingdom ............... 30921/76

[51] Int. Cl.² ............................................... H02J 7/00
[52] U.S. Cl. ........................................... 320/7; 320/16
[58] Field of Search ....................... 320/2, 5, 6, 7, 15, 320/16

[56] References Cited

U.S. PATENT DOCUMENTS 3,029,301 4/1962 Strider ................................ 320/7 X
3,763,415 10/1973 Ownby ................................. 320/6

FOREIGN PATENT DOCUMENTS 1448053 9/1976 United Kingdom ....................... 320/7

Primary Examiner—Robert J. Hickey
Attorney, Agent, or Firm—Kemon & Estabrook

[57] ABSTRACT

An arrangement for charging a rechargeable battery which has a plurality of sections. The battery can be selectively connected by a switch either to a source of charging current or to supply power to a load. When the battery is connected to the charging current source the sections are connected in parallel and when it is connected to a load the sections are connected in series.

5 Claims, 1 Drawing Figure

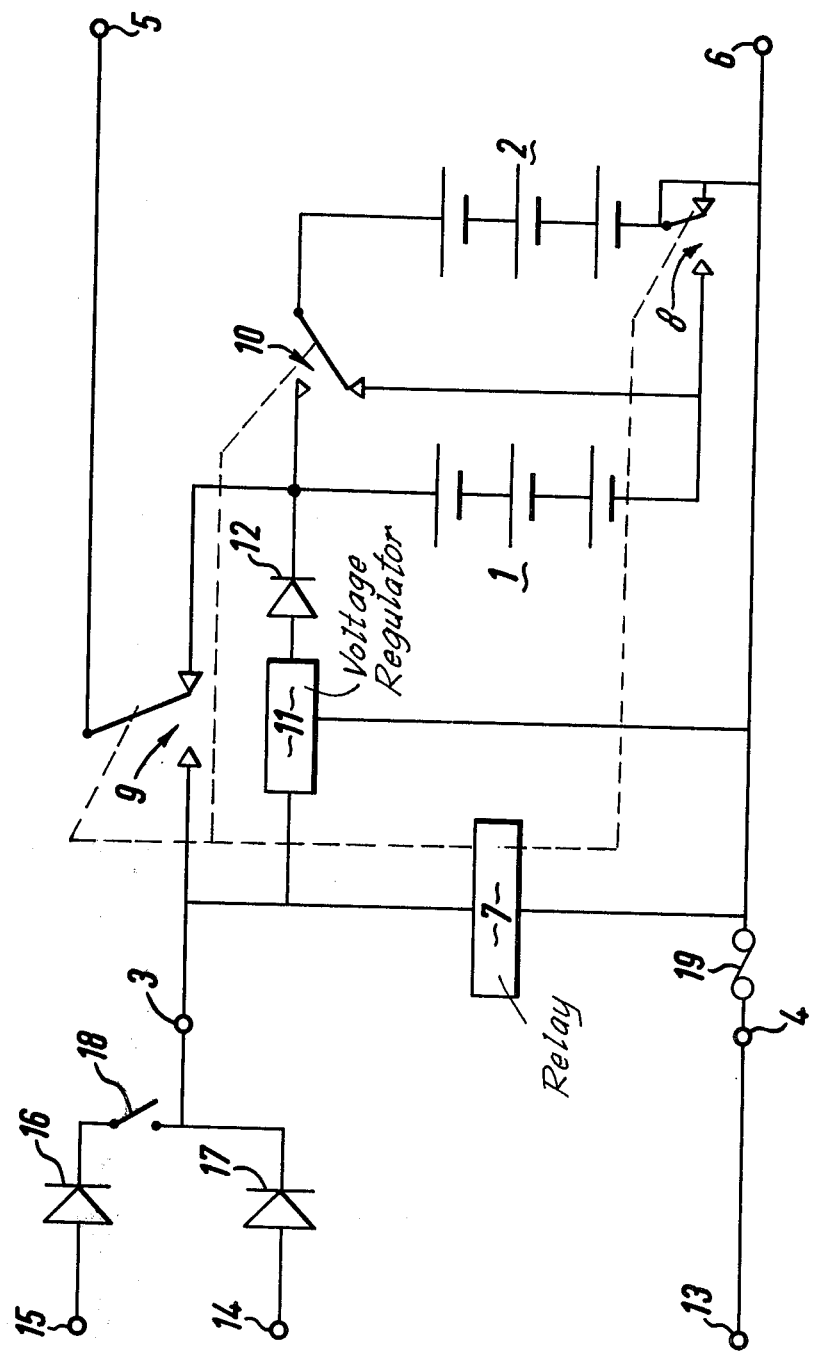

BATTERY CHARGING APPARATUS

This invention relates to battery charging apparatus. In particular, but not exclusively, it relates to apparatus for charging batteries from a source of potential which is of the order of or lower than the battery potential.

Many pieces of portable electrical apparatus are powered by rechargeable batteries, which have to be recharged after a period of use. Many public utilities and other users, carry portable electrical apparatus powered by rechargeable batteries in motor vehicles, which commonly have a 12V electrical system. It would be convenient to be able to recharge the batteries of the portable apparatus from the motor vehicle's own electrical system, but commonly the battery voltage in the apparatus is 12V and that in the motor vehicle is 12V, so recharging while the vehicle engine is not running is not practicable.

It is therefore an object of the present invention to provide means whereby a rechargeable battery may be recharged from an electrical supply of a voltage lower than the output voltage of the rechargeable battery.

According to one aspect of the invention there is provided battery charging apparatus comprising a rechargeable battery having a plurality of sections, input terminal means to which a source of charging current can be connected, output terminal means and switch means operable to connect the battery sections in parallel with the input terminal means or in series with the output terminal means.

According to another aspect of the invention there is provided a method of charging a battery having a plurality of sections which are normally connected in series to supply power to an output, the method comprising connecting said plurality of sections in parallel with a source of charging current.

By dividing the battery into sections and connecting the sections in parallel the required charging potential can be reduced by a factor corresponding to the number of sections.

The switch means may be a relay, the battery section normally being connected in series across the output terminal means and said relay being responsive to a voltage applied to the input terminal means to connect the sections in parallel across said input. The switch means may be operable to disconnect the battery from the output terminal means and connect the output to the input terminal means.

The apparatus may include voltage regulation means connected between the input terminal means and the battery for regulating the voltage of the charging source. The apparatus may also include a diode connected between the input terminal means and the battery for preventing reverse currents.

The input terminal means may be connected to the power source of a vehicle. The input terminal means may be connected to the power source of the vehicle in such a way that when the ignition of the vehicle is switched off the battery can be connected to the power source only by operation of a further switch and when the ignition of the vehicle is switched on the battery can be permanently connected to the power source.

The invention will now be described by way of example and with reference to the accompanying drawing, which shows a diagram of a battery charging circuit according to the invention.

Referring now to the drawing a rechargeable battery divided into two equal sections respectively referenced 1 and 2. The input to the circuit comprises a pair of terminals 3 and 4 and the output from the circuit, which would be connected to apparatus which the battery was being used to power, comprises a pair of terminals 5 and 6. A relay coil 7 is connected across the input terminals 3 and 4 and has associated relay contacts 8, 9 and 10. The relay contacts are shown as is convention in the position when the relay coil is not energised and it will be seen that in this position the two sections of the battery 1 and 2 are connected in series across the output terminals 5 and 6. When a voltage sufficiently high to operate the relay is applied across the input terminals 3 and 4, it being arranged of course that this voltage is sufficient to recharge one-half of the battery, the contacts 8, 9 and 10 change over. In this position it will be seen by inspection that the two halves of the battery, respectively 1 and 2, are now connected in parallel across the input terminals 3 and 4 and the input terminal 3 is directly connected to output terminal 5; terminals 4 and 6 are permanently connected. Thus the electrical power applied through the input terminals 3 and 4 will both recharge the battery and supply power to the apparatus. It will be appreciated that the supply voltage required by the apparatus must be that which is applied to the recharging apparatus and in the case of a motor vehicle this is 12V. However it is impracticable to recharge a 12V battery from a 12V source, since in order to achieve a charging current through the battery an over voltage is necessary. By dividing the battery into two halves, each having, in the case of a 12V system, a potential of 6V this over voltage can be achieved using a 12V supply. Those skilled in the art will know that lead/acid batteries in the fully charged state have an open circuit voltage of somewhat greater than the nominal 2V per cell.

The circuit shown in the drawing also has a voltage regulator 11 and a diode 12. These are conventional components of many battery charging circuits and are provided in order to prevent over-charging and reverse currents respectively.

Also shown in the diagram is a further refinement of the apparatus, particularly suitable again for use in motor vehicles. The supply from the motor vehicle is supplied through three terminals 13, 14 and 15. Terminal 15 is wired directly to the point in the vehicle's system from which a continuous 12V supply is available while the terminal 14 is wired to a supply controlled by the vehicle's ignition switch in a petrol engined vehicle, or a corresponding point in a diesel engined vehicle. Terminal 13 is wired to the vehicle earth. Diodes 16 and 17 are provided as shown in the inputs from the terminals 15 and 14 respectively. A switch 18 ganged to the main on-off switch of the apparatus which the rechargeable battery is suppling through terminals 5 and 6 is provided also in the lead from the terminal 15. An advantage of this arrangement is that whilst the vehicle is stationary with the ignition switched off power can only be supplied from the vehicle to the input of the battery charging circuit when the switch 18 is closed, that is when the apparatus is in use plugged into the vehicle supply. Since the apparatus will be switched off when it is being left for any length of time there is little danger that the vehicle battery will be run down by the drain of the apparatus connected to it. However, when the vehicle is in motion and the ignition switch is switched on a supply from the vehicle electrical system will be permanently applied to the battery charging circuit, with the advantage that the battery will always be recharged when the vehicle is in motion without the operator having to take any special steps. The diodes 16 and 17 are provided to ensure that currents cannot flow from the battery charging apparatus into the main electrical system of the vehicle and thus cause mal-operation.

A fuse 19 is shown in the circuit in order to protect the battery charging apparatus from excess currents, as is common conventional practice.

I claim:

1. Battery charging apparatus comprising a rechargeable battery having a plurality of sections, input terminal means to which a source of charging current can be connected, output terminal means and switch means normally connecting said battery sections in series across said output terminals controlled by a relay connected across said input terminals and operative when energized by application of a pre-determined voltage to said input terminals to disconnect said battery from said output terminals, connect said battery sections in parallel across said input terminals and connect said input and output terminals.

2. Apparatus as claimed in claim 1, including voltage regulation means connected between the input terminal means and the battery for regulating the voltage of the charging source.

3. Apparatus as claimed in claim 2, including a diode connected between the input terminal means and the battery for preventing reverse currents.

4. Apparatus as claimed in claim 1, wherein the input terminal means is connected to the power source of a vehicle.

5. Apparatus as claimed in claim 4, wherein the input terminal means is connected to the power source of the vehicle in such a way that when the ignition of the vehicle is switched off the battery can be connected to the power source only by operation of a further switch and when the ignition of the vehicle is switched on the battery can be permanently connected to the power source.

* * * * *